US012655966B1

(12) United States Patent
He

(10) Patent No.: US 12,655,966 B1
(45) Date of Patent: Jun. 16, 2026

(54) DECORATIVE CHRISTMAS TREE WITH LIGHT AND SHADOW CONVERSION

(71) Applicant: SHANGYOU JIAYI LIGHTING PRODUCT CO., LTD., Shangyou City (CN)

(72) Inventor: Yaowen He, Shangyou City (CN)

(73) Assignee: SHANGYOU JIAYI LIGHTING PRODUCT CO., LTD., Shangyou City (CN)

( * ) Notice: Subject to any disclaimer, the term of this patent is extended or adjusted under 35 U.S.C. 154(b) by 0 days.

(21) Appl. No.: 19/385,937

(22) Filed: Nov. 11, 2025

(30) Foreign Application Priority Data

Oct. 29, 2025 (CN) ......................... 202522283901.2

(51) Int. Cl.
*F21V 21/16* (2006.01)
*F21V 23/02* (2006.01)
*F21W 121/04* (2006.01)
*F21Y 103/10* (2016.01)
*F21Y 107/30* (2016.01)
*F21Y 115/10* (2016.01)

(52) U.S. Cl.
CPC .............. *F21V 21/16* (2013.01); *F21V 23/02* (2013.01); *F21W 2121/04* (2013.01); *F21Y 2103/10* (2016.08); *F21Y 2107/30* (2016.08); *F21Y 2115/10* (2016.08)

(58) Field of Classification Search
CPC ..... F21V 21/16; F21V 23/02; F21W 2121/04; F21Y 2103/10; F21Y 2107/30; F21Y 2115/10
See application file for complete search history.

(56) References Cited

U.S. PATENT DOCUMENTS 4,072,857 A * 2/1978 DeVicaris ............... F21S 8/035 362/431
6,588,914 B1 * 7/2003 Tang ......................... F21S 4/10 362/249.19
7,055,980 B2 * 6/2006 Wu ........................... F21S 4/10 362/249.14
9,883,566 B1 * 1/2018 Chen ...................... H05B 45/10
10,683,974 B1 * 6/2020 Chen ......................... F21S 4/22
10,982,828 B1 * 4/2021 Chen ...................... A47G 33/06
D1,095,935 S * 9/2025 Gong ........................... D26/101
D1,106,558 S * 12/2025 Zhu .............................. D26/101
2002/0097577 A1 * 7/2002 Huang ................ F21V 21/0824 362/240
2014/0287618 A1 * 9/2014 Chen ......................... F21S 4/10 439/527
2015/0070878 A1 * 3/2015 Yu .......................... A47G 33/06 29/601
2022/0322862 A1 * 10/2022 Soofer ................... H04R 1/028
2024/0016325 A1 * 1/2024 Yang ...................... A47G 33/06

* cited by examiner

*Primary Examiner* — Tsion Tumebo
(74) *Attorney, Agent, or Firm* — AVEK IP, LLC

(57) ABSTRACT

Some embodiments of the disclosure provide decorative Christmas trees with light and shadow conversion functions. In some examples, a plurality of iron wires may be respectively bent at different angles or form a shape, such that a light emitting device forms a shape such as a simulated firework. In other examples, a central tree trunk and support rod assemblies may be detached and assembled arbitrarily to fit various indoor and outdoor scenarios. The iron wires of the light emitting device may also be gathered converged, which may facilitate transportation, storage, and stowage.

11 Claims, 11 Drawing Sheets

DECORATIVE CHRISTMAS TREE WITH LIGHT AND SHADOW CONVERSION

FIELD OF THE DISCLOSURE

The present disclosure relates to the technical field of decorative lamps, and in particular to a decorative Christmas tree with light and shadow conversion.

BACKGROUND

With the diversification of holiday decoration needs, conventional illuminated Christmas trees can no longer meet the pursuit of decorative effects. Most decorative lamps in the prior art adopt fixed light strings or static light emitting elements. For example, the Christmas tree lamp disclosed in Chinese Patent No. CN211424321U belongs to this type. Although such Christmas tree decorative lamps can achieve basic lighting, they lack dynamic visual effects and interactivity. In addition, conventional Christmas trees are usually assembled from large components, which causes inconvenience in transportation and storage and makes it impossible to flexibly adjust the shapes of the Christmas trees according to scenarios. In view of this, inventors have developed a new invention.

SUMMARY

In some embodiments, a decorative Christmas tree with light and shadow conversion provided by the present disclosure includes a base, a power source assembly is configured to be electrically connected to an external power supply, and a central tree trunk mounted on the base, wherein the central tree trunk is provided with at least a plurality of layers of support rod assemblies, and the support rod assemblies are in pluggable connection to the central tree trunk.

The support rod assemblies each include at least one support rod, and an extending end of the support rod is connected to a light emitting device to form a light and shadow change.

The light emitting device includes a plurality of bendable and deformable iron wires and light emitting diode (LED) light strips distributed along the iron wires, the LED light strips each include a plurality of LED light emitting chips, and the LED light strips are electrically connected to the power source assembly.

Further, the LED light strips are flexible light strips, spirally wound on surfaces of the iron wires.

Further, the plurality of bendable and deformable iron wires are provided with common ends, and at least a part of the common ends is tightly fixed together along an axial direction.

Further, the plurality of bendable and deformable iron wires are provided with common ends, at least a part of the common ends is tightly fixed together along an axial direction, the extending end of the support rod is provided with an accommodating cavity, and the common ends are fastened in the accommodating cavity.

Further, the central tree trunk includes a first tree trunk, a second tree trunk, and a third tree trunk, a lower end of the first tree trunk is in pluggable connection to the base, the second tree trunk is in pluggable connection to the first tree trunk, and the third tree trunk is in pluggable connection to the second tree trunk.

Further, the central tree trunk includes a first tree trunk, a second tree trunk, and a third tree trunk, and the first tree trunk, the second tree trunk, and the third tree trunk are all central penetrating tree trunks.

Further, the central tree trunk is provided with a hollow tree branch crotch portion, and the support rod is in pluggable connection to the tree branch crotch portion.

Further, the power source assembly is connected to a hierarchical parallel wire group and a single-layer parallel wire group connected to the hierarchical parallel wire group, and the single-layer parallel wire group is electrically connected in parallel to the light emitting device.

Further, the power source assembly is connected to a hierarchical parallel wire group and a single-layer parallel wire group connected to the hierarchical parallel wire group, the support rod is hollow, the single-layer parallel wire group penetrates into the hollow support rod and is electrically connected to the light emitting device.

Further, the power source assembly is connected to a hierarchical parallel wire group and a single-layer parallel wire group connected to the hierarchical parallel wire group, the decorative Christmas tree is further provided with a surrounding layer coating the support rod, and at least a part of the single-layer parallel wire group is located between the support rod and the surrounding layer.

Further, the base is provided with a support ring and a hollow support cylinder, a support frame is disposed between the support ring and the support cylinder, and the support frame fixes the support cylinder to enable a bottom of the support cylinder to be higher than the support ring, such that a wire of the power source assembly penetrates into the support cylinder.

Further, the power source assembly is provided with an electrical plug, an electrical signal conversion controller, and a hierarchical parallel wire group, and the hierarchical parallel wire group is electrically connected to the electrical signal conversion controller.

BRIEF DESCRIPTION OF THE DRAWINGS

Illustrative embodiments of the present disclosure are described in detail below with reference to the attached drawing figures.

REFERENCE NUMERALS IN THE FIGURES

Figure 1:
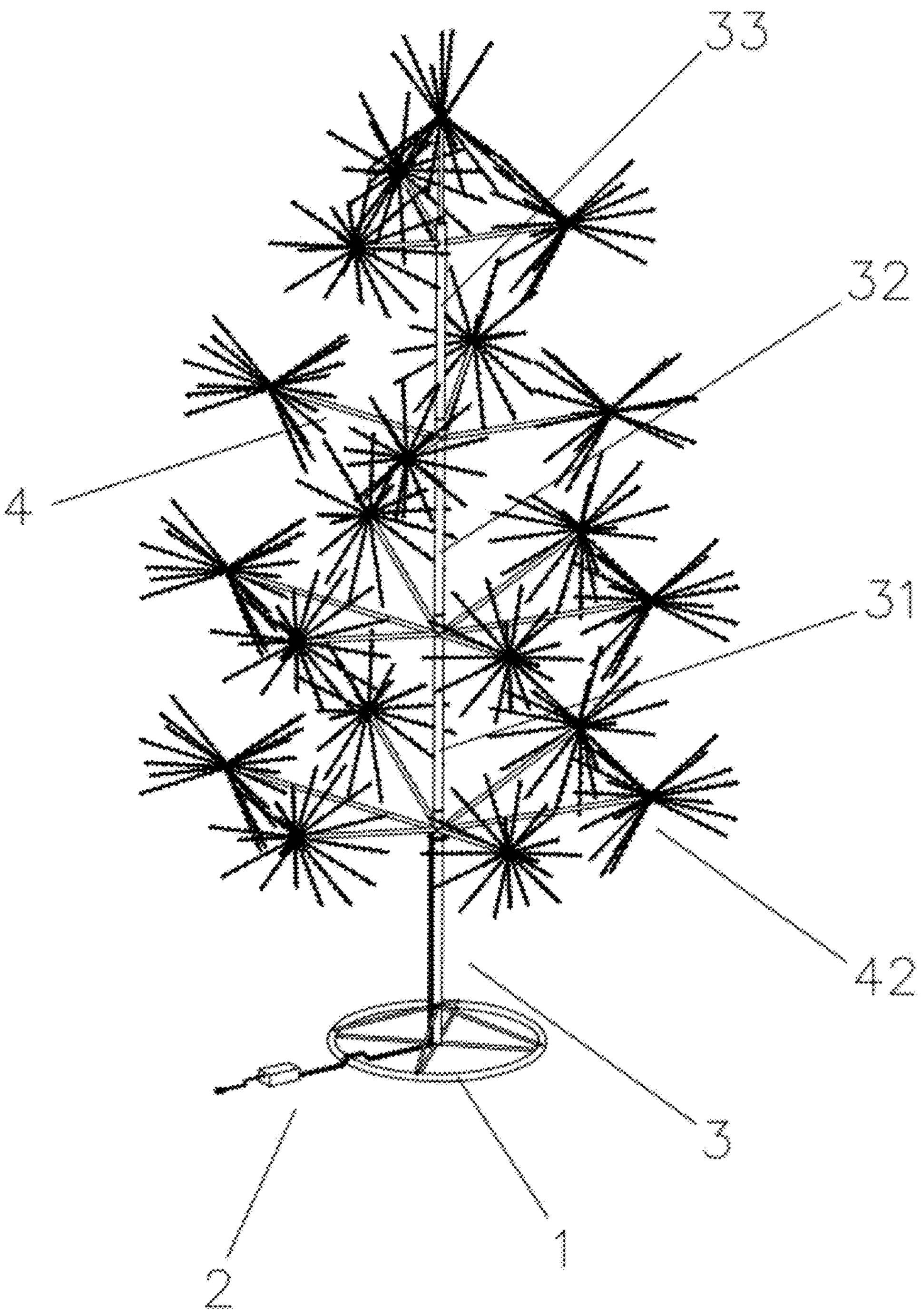
FIG. 1 is a three-dimensional schematic view in an embodiment of the present disclosure.
Figure 2:
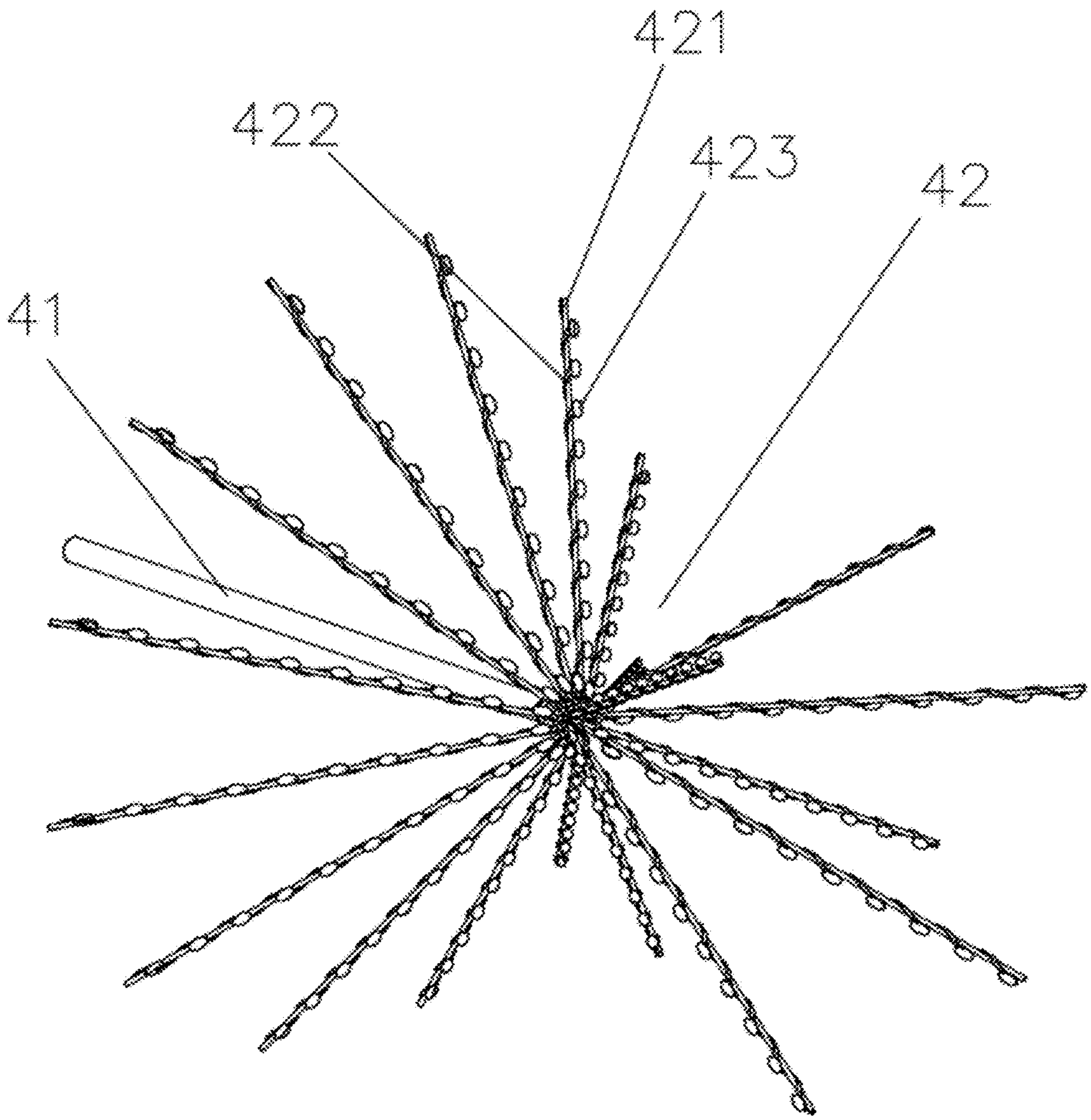
FIG. 2 is a schematic structural view of a support rod assembly in an embodiment of the present disclosure.
Figure 3:
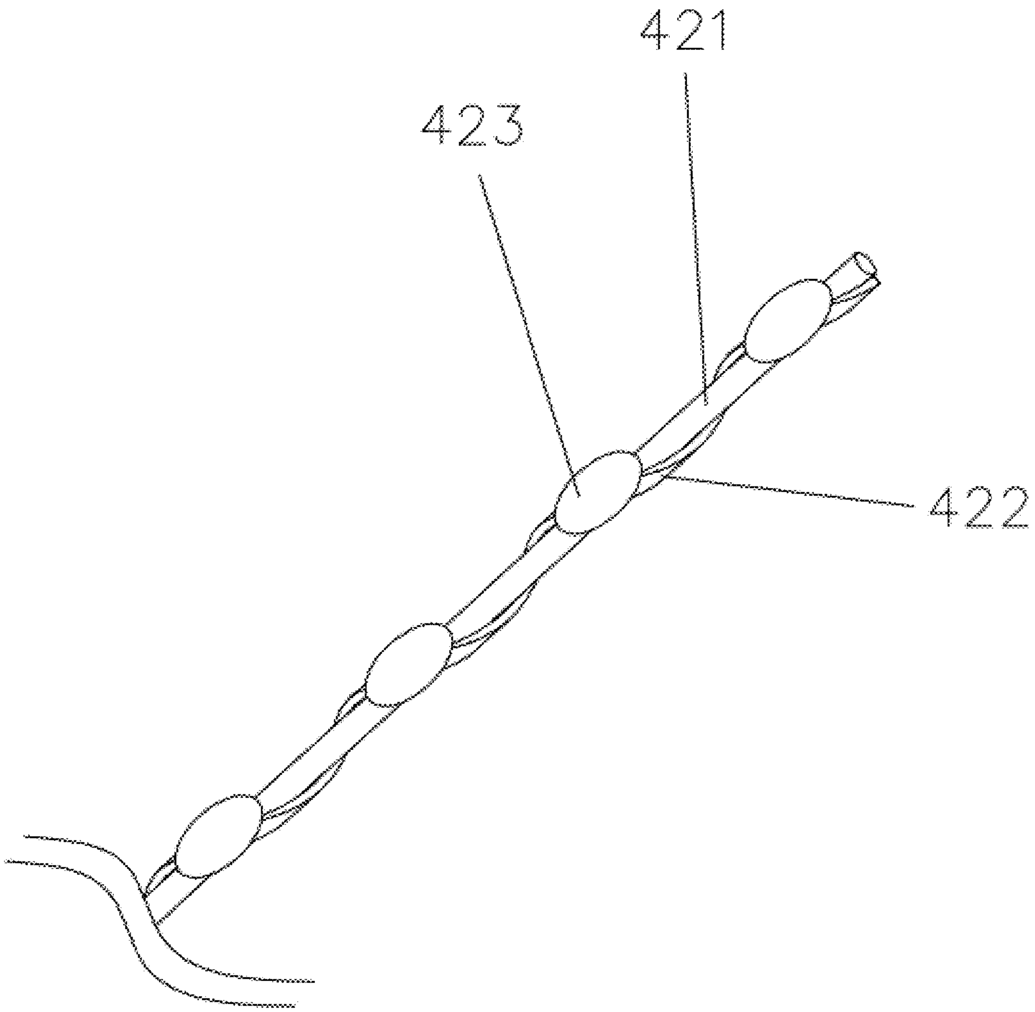
FIG. 3 is a schematic structural view of an iron wire, an LED light strip, and an LED lamp core in an embodiment of the present disclosure.
Figure 4:
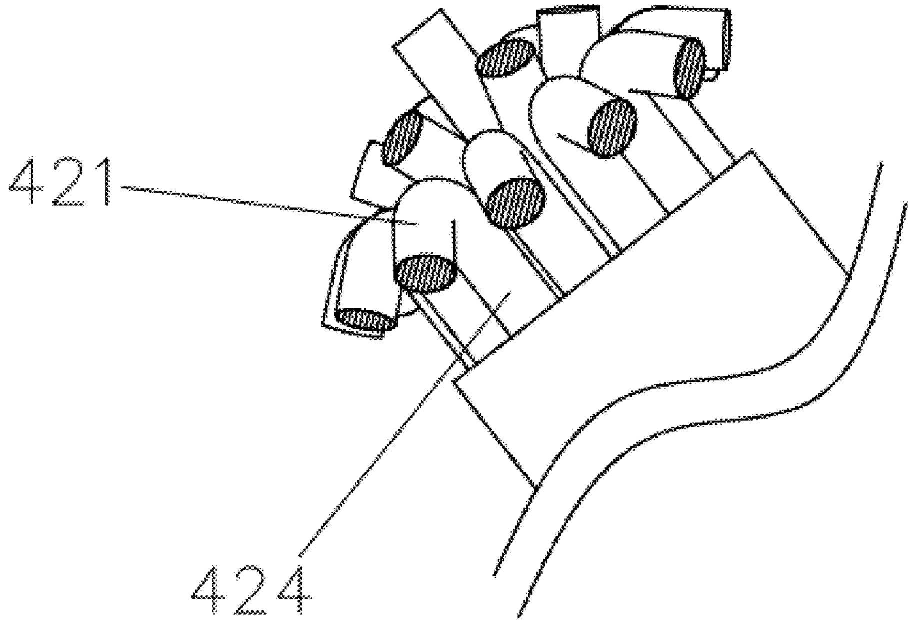
FIG. 4 is a partial cross-sectional schematic view of an iron wire in an embodiment of the present disclosure.
Figure 5:
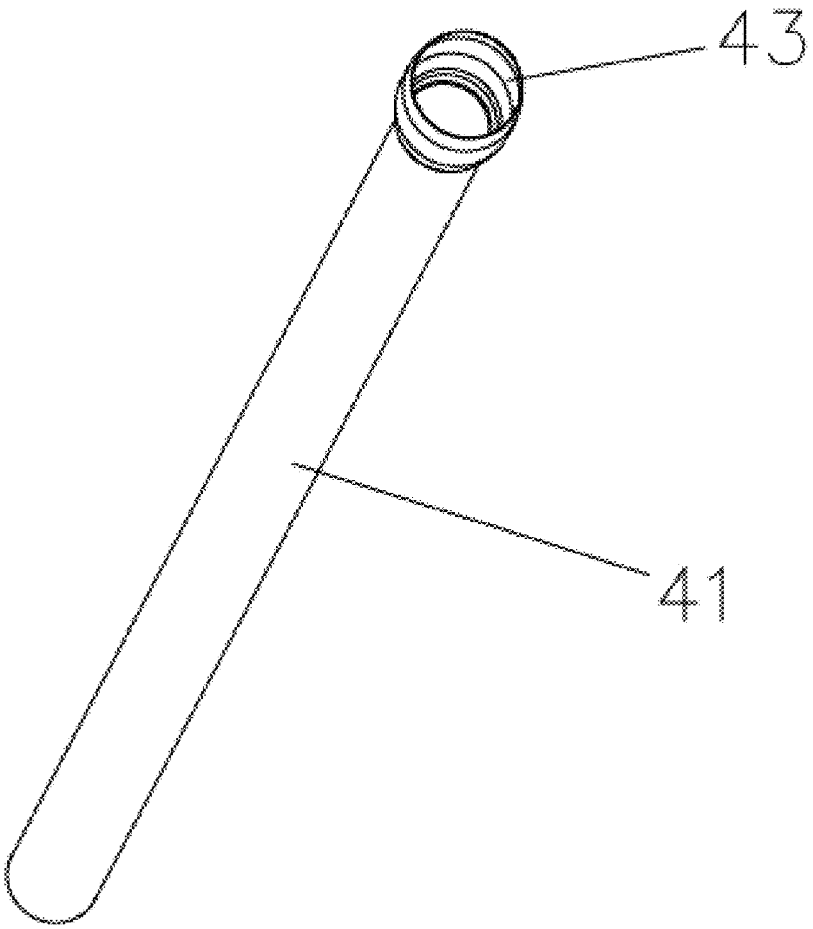
FIG. 5 is a schematic structural view of a support rod in an embodiment of the present disclosure.

1, base; 11, support ring; 12, support cylinder; 13, support frame; 2, power source assembly; 21, hierarchical parallel wire group; 22, single-layer parallel wire group; 23, electrical plug; 24, electrical signal conversion controller; 3, central tree trunk; 31, first tree trunk; 32, second tree trunk; 33, third tree trunk; 34, tree branch crotch portion; 35, plug ring; 36, plug port; 4, support rod assembly; 41, support rod; 42, light emitting device; 421, iron wire; 422, LED light strip; 423, LED light emitting chip; 424, common end; 43, accommodating cavity; and 44, surrounding layer.

DETAILED DESCRIPTION

The following describes some non-limiting exemplary embodiments of the present disclosure with reference to the accompanying drawings. The described embodiments are merely a part rather than all the embodiments of the present disclosure. All other embodiments obtained by a person of ordinary skill in the art based on the embodiments of the present disclosure shall within the scope of the present disclosure.

The decorative Christmas tree with light and shadow conversion provided by the present disclosure includes a base 1, where the base 1 has a certain counterweight. It is preferable that this counterweight is heavier than the central tree trunk 3, such that the central tree trunk may be more reliable during use and will not easily tip over. The decorative Christmas tree with light and shadow conversion further includes a power source assembly 2 electrically connected to an external power supply, and the central tree trunk 3 mounted on the base 1. To form a tree-like structure, the central tree trunk 3 is provided with at least a plurality of layers of support rod assemblies 4, and the support rod assemblies 4 are in pluggable connection to the central tree trunk 3.

The support rod assemblies 4 each include at least one support rod 41, and an extending end of the support rod 41 is connected to a light emitting device 42 to form a light and shadow change; the support rods 41 in each layer of support rod assemblies 4 are different in length. The higher up it goes, the shorter the length of the support rod 41. Therefore, the support rod assemblies 4 and the central tree trunk 3 are combined to form an approximately Christmas tree shape. It should be further emphasized that the "Christmas tree" referred to in the present disclosure is not limited to being used for decoration only during Christmas. Obviously, it may also be used for decoration in other possible scenarios.

The light emitting device 42 includes a plurality of bendable and deformable iron wires 421 and light emitting diode (LED) light strips 422 distributed along the iron wires 421, the LED light strips 422 each include a plurality of LED light emitting chips 423, and the LED light strips 422 are electrically connected to the power source assembly 2. The iron wires 421 are main support members for the LED light strips 422. The LED light strips deform as the iron wires 421 deform. The plurality of iron wires 421 may be bent at different angles respectively, such that the light emitting device 42 form a shape simulating firework bursting. Certainly, the single iron wire 421 may also be independently deformed to a letter, to form a letter or word with a light emitting effect; similarly, the single iron wire 421 may also be bent to form various concise patterns, such as a light emitting ring. A user may completely perform DIY combination and deformation of the single or plurality of iron wires 421 according to own imagination. The power source assembly 2 supplies power to the LED light strips 422, and the LED light emitting chips 423 flicker and emit light at preset or self-set frequencies by using the control device. The light emitting device 42 simulates firework blooming by means of the light and shadow conversion effect since the light emitting chips flicker in sequence, such that the decorative Christmas tree has a high aesthetic degree. Certainly, since the light emitting device 42 is provided with the plurality of iron wires 421 and the plurality of LED light emitting chips, the decorative Christmas tree may smoothly achieve lighting effects such as flowing light, colored light blooming, flickering surrounding, chasing light, letters, and numbers, thereby having an extremely excellent decorative effect.

The LED light strips 422 are flexible light strips, spirally wound on surfaces of the iron wires 421. The LED light strips 422 and the corresponding LED light emitting chips 423 may change in position along with deformation of the iron wires 421, such that the iron wires 421 may be bent to a great extent. For example, the light emitting device 42 may simulate the firework blooming effect more perfectly.

The plurality of bendable and deformable iron wires 421 are provided with common ends 424, and at least a part of the common ends 424 is tightly fixed together along an axial direction. This structure makes the plurality of iron wires 421 bundled into a bundle, and the plurality of iron wires 421 may be bent outward arbitrarily. During use, the user may bend the iron wires 421 in various direction and at various angles in sequence, such that the light emitting device 42 may simulate the firework blooming effect. During convergence, such as transportation and stowage, the user may fold all the iron wires 421 together at one time by a hand operation, and then bind and fix the iron wires by means of tools such as rubber rings, such that the convenience is high.

The plurality of bendable and deformable iron wires 421 are provided with common ends 424, at least a part of the common ends 424 is tightly fixed together along an axial direction, the extending end of the support rod 41 is provided with an accommodating cavity 43, and the common ends 424 are fastened in the accommodating cavity 43. The plurality of iron wires 421, the LED light strips 422 wound to the iron wires 421, and the LED light emitting chips 423 distributed on the LED light strips 422 are combined to form the light emitting device 42. The common ends 424 are fastened in the accommodating cavity 43, such that the light emitting device 42 is connected and fixed to the support rod 41, and the light emitting device 42 is not easily loosened and is high in stability.

The central tree trunk 3 includes a first tree trunk 31, a second tree trunk 32, and a third tree trunk 33, a lower end of the first tree trunk 31 is in pluggable connection to the base 1, the second tree trunk 32 is in pluggable connection to the first tree trunk 31, and the third tree trunk 33 is in pluggable connection to the second tree trunk 32. The first tree trunk 31, the second tree trunk 32, and the third tree trunk 33 each are provided with at least one layer of support rod assembly 4. The support rod assemblies disposed on the first tree trunk 31, the second tree trunk 32, and the third tree trunk 33 are different in number, and the support rods 41 are different in length, too. Specifically, the base 1, the central tree trunk 3, and the support rod assemblies 4 are combined to form the decorative Christmas tree. The number of the support rod assemblies 4 disposed on the first tree trunk 31 is greater than the number of the support rod assemblies 4 disposed on the second tree trunk 32, the number of the support rod assemblies 4 disposed on the second tree trunk is greater than the number of the support rod assemblies 4 disposed on the third tree trunk 33, and the first tree trunk 31 and the second tree trunk 32 are not limited to one. The first tree trunk 31 may be plugged above the base 1 or the first tree trunk 31, the second tree trunk is plugged above the first tree trunk 31 or the second tree trunk, and the third tree trunk 33 is plugged above the second tree trunk 32. The central tree trunk 3 may be formed by combining the base 1, a first tree trunk 31, a second tree trunk 32, and a third tree trunk 33. The decorative Christmas tree in this combination is provided with three layers of tree trunks. The central tree trunk 3 may be formed by combining the base 1, two first tree trunks 31, a second tree trunk 32, and a third tree trunk 33. The decorative Christmas tree in this combination is provided with four layers of tree trunks. By parity of reasoning, the higher up it goes, the smaller the length of the support rod 41. The plurality of layers of support rod assemblies 4 and the central tree trunk 3 are combined to form the shape of the Christmas tree. The central tree trunk 3 and support rod assemblies 4 may be detached and assembled arbitrarily to form Christmas trees with different sizes and heights to fit various indoor and outdoor scenarios.

The central tree trunk 3 includes a first tree trunk 31, a second tree trunk 32, and a third tree trunk 33, and the first tree trunk 31, the second tree trunk 32, and the third tree trunk 33 are all central penetrating tree trunks. The first tree trunk 31, the second tree trunk 32, and the third tree trunk 33 each are of a housing structure with an interconnected cavity in the middle, such that the cost is low and the weight is small. The central tree trunk 3 is also conveniently carried and moved after being formed by combination. A wire of the power source assembly 2 may be connected to each of the support rod assemblies 4 through the cavities of the first tree trunk 31, the second tree trunk, and the third tree trunk 33.

The central tree trunk 3 is provided with a hollow tree branch crotch portion 34, and the support rod 41 is in pluggable connection to the tree branch crotch portion 34. A plurality of tree branch crotch portions 34 are disposed. One support rod 41 may be plugged into each of the tree branch crotch portions 34, such that the tree branch crotch portion 34 is connected one support rod assembly 4. The wire of the power source assembly 2 may penetrate through the tree branch crotch portion 34 and is connected to the support rod assembly 4. In this manner, the wire of the power source assembly 2 may be hidden and distribution of the wire may be guided to avoid wire tangling or interference with other support rod assemblies 4, thereby improving the safety.

The power source assembly 2 is connected to a hierarchical parallel wire group 21 and a single-layer parallel wire group 22 connected to the hierarchical parallel wire group, and the single-layer parallel wire group 22 is electrically connected in parallel to the light emitting device 42. A plurality of single-layer parallel wire groups 22 are disposed. Each of the single-layer parallel wire groups 22 is electrically connected in parallel to the light emitting device 42 on the single support rod assembly 4. Specifically, the light emitting device 42 is provided with a plurality of LED light strips 422 wound to the iron wires. Each of the LED light strips 422 is electrically connected in parallel to the single-layer parallel wire group 22, such that other LED light strips 422 are not affected after individual LED light strips 422 are accidentally disconnected to electric wires, thereby improving the using stability of the light emitting device 42. Similarly, each single-layer parallel wire group 22 is electrically connected in parallel to the hierarchical parallel wire group 21. When one support rod assembly 4 is detached, the light emitting devices 42 of other support rod assemblies 4 may be still connected to the electric wire of the power source assembly 2. The support rod assembly 4 may be flexibly disassembled and assembled, such that the convenience is high.

The power source assembly 2 is connected to a hierarchical parallel wire group 21 and a single-layer parallel wire group 22 connected to the hierarchical parallel wire group, the support rod 41 is hollow, the single-layer parallel wire group 22 penetrates into the hollow support rod 41 and is electrically connected to the light emitting device 42. The central tree trunk 3 penetrates centrally. The hierarchical parallel wire group 21 passes through the center position of the central tree rod 3. The light emitting device 42 is disposed at the end of the support rod 41. A tail end of the single-layer parallel wire group 22 passes through the middle portion of the support rod 41 and is connected to the electric wire of the light emitting device 42. Another tail end of the single-layer parallel wire group 22 passes through the tree branch crotch portion 34, extends into the center position of the central tree trunk 3, and is electrically connected to the hierarchical parallel wire group 21. This structure enables the hierarchical parallel wire group 21 and the single-layer parallel wire group 22 both hidden inside the central tree trunk 3 and the support rod assembly 4, such that the decorative Christmas tree is neater and more aesthetic, and at the same time, it also has the function of preventing rainwater and dew.

Figure 6:
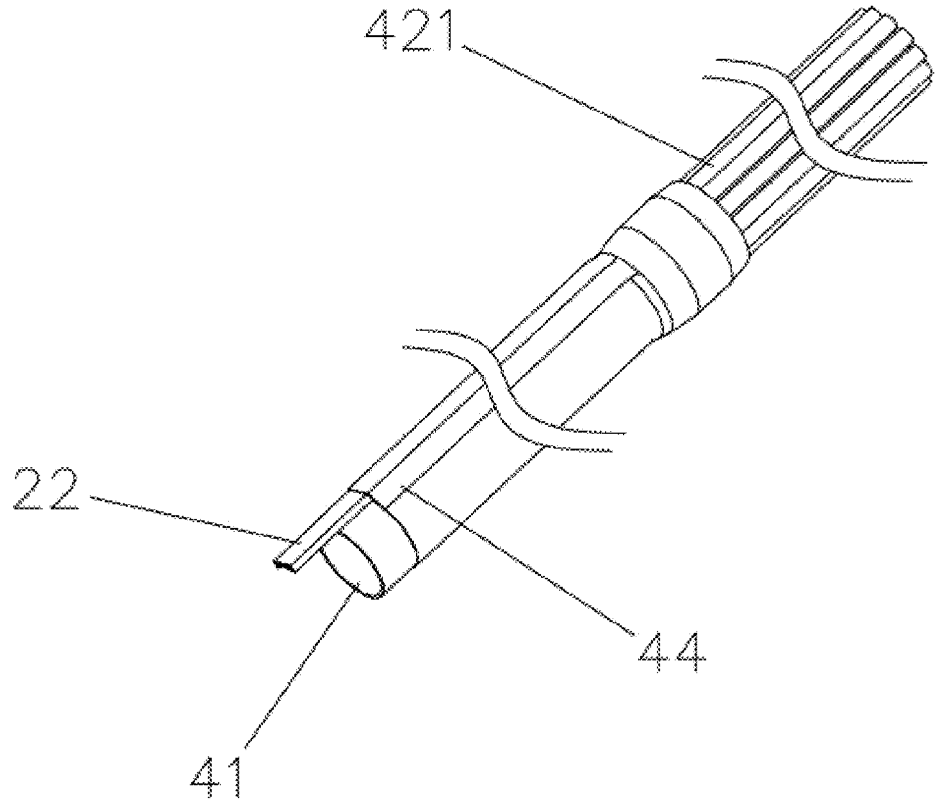
FIG. 6 is a schematic structural view of a connection between a support rod, a single-layered parallel wire group, and a surrounding layer in an embodiment of the present disclosure.
Figure 7:
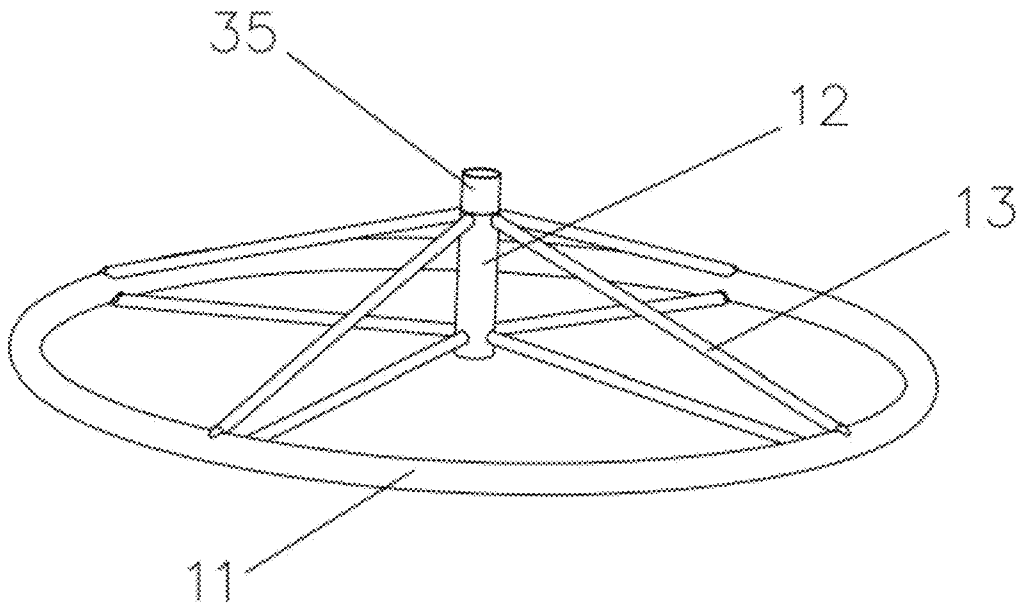
FIG. 7 is a schematic structural view of a base in an embodiment of the present disclosure.
Figure 8:
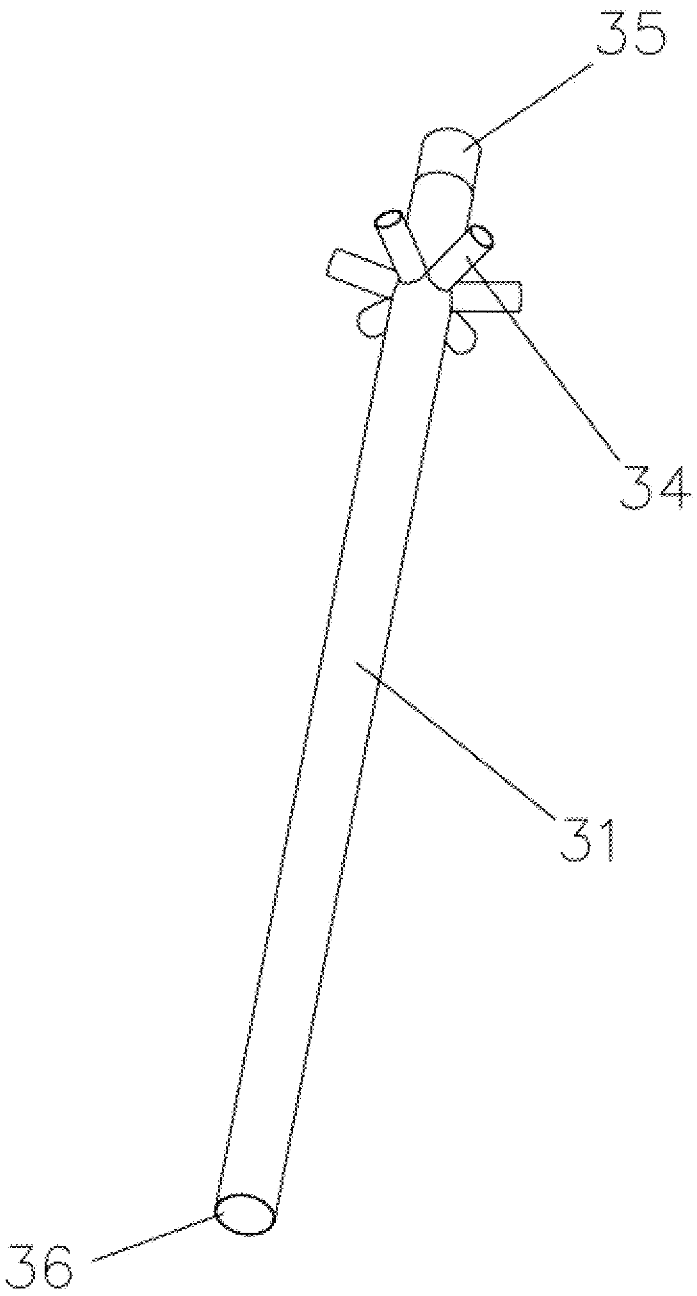
FIG. 8 is a schematic structural view of a first tree trunk in an embodiment of the present disclosure.
Figure 9:
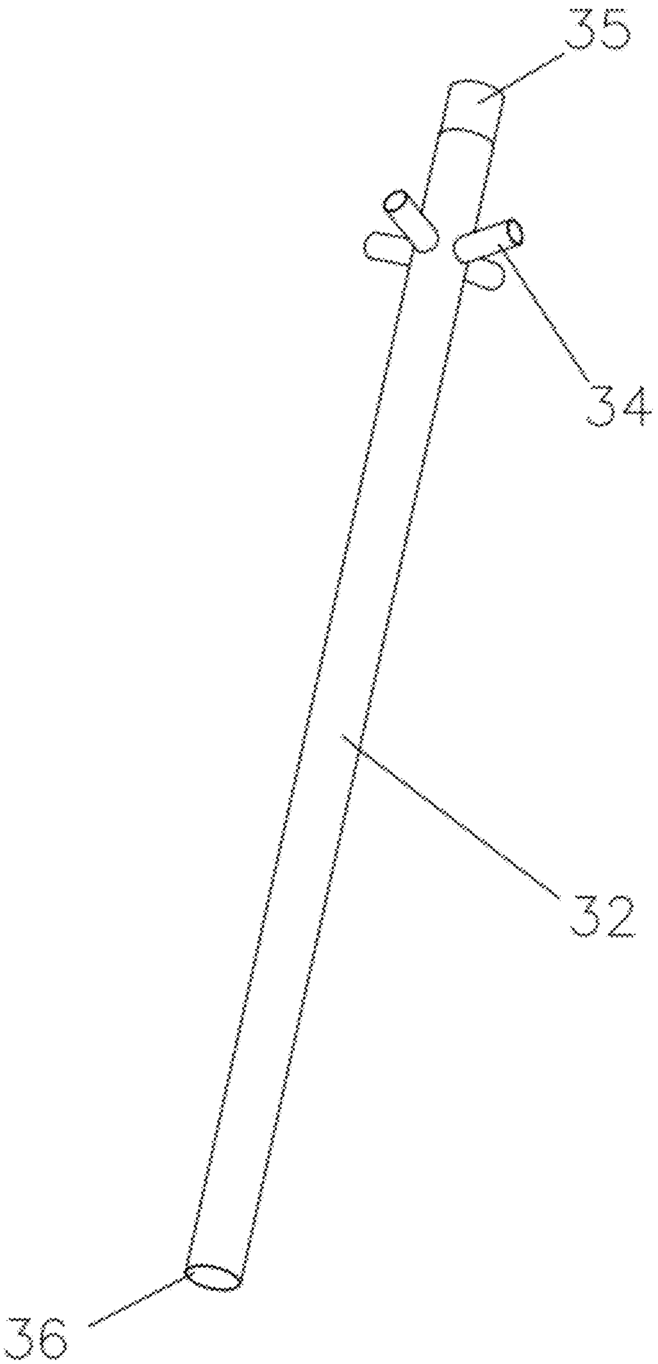
FIG. 9 is a schematic structural view of a second tree trunk in an embodiment of the present disclosure.
Figure 10:
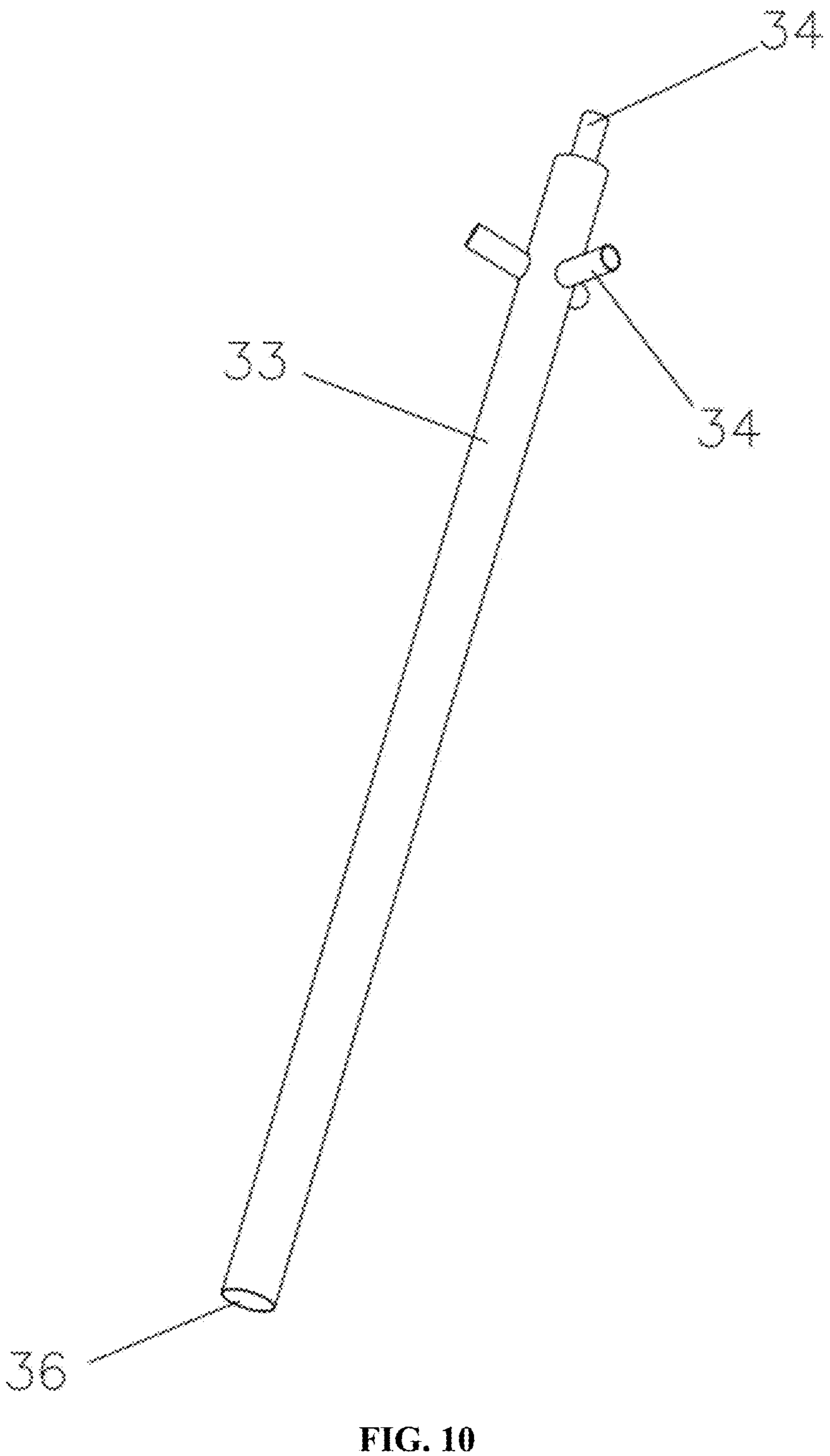
FIG. 10 is a schematic structural view of a third tree trunk in an embodiment of the present disclosure.
Figure 11:
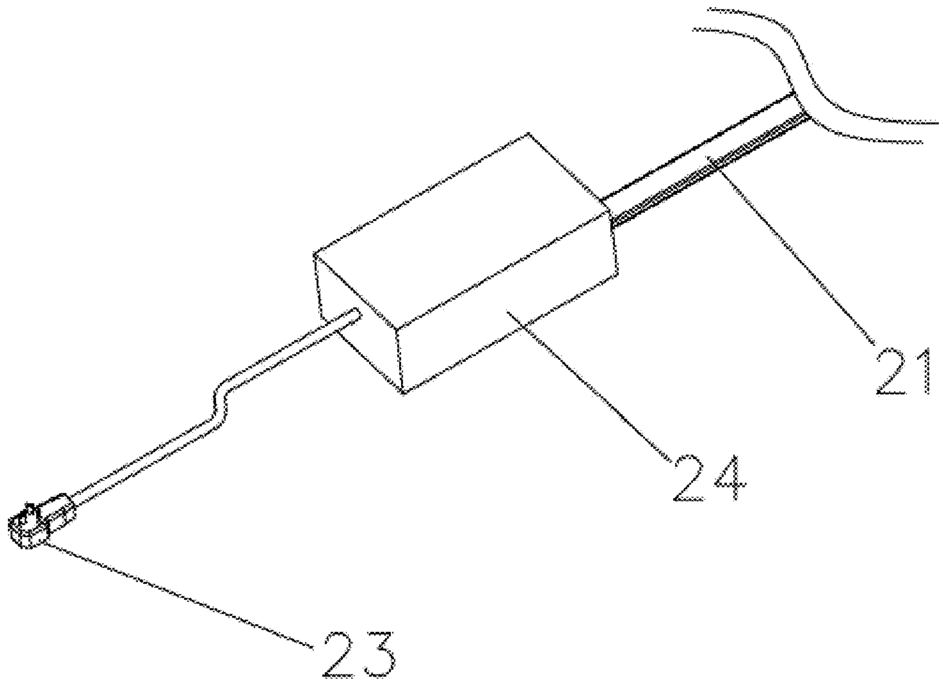
FIG. 11 is a partial schematic structural view of a power source assembly in an embodiment of the present disclosure.

As another implementation, the power source assembly 2 is connected to a hierarchical parallel wire group 21 and a single-layer parallel wire group 22 connected to the hierarchical parallel wire group, the decorative Christmas tree is further provided with a surrounding layer 44 coating the support rod 41, and at least a part of the single-layer parallel wire group 22 is located between the support rod 41 and the surrounding layer 44. The hierarchical parallel wire group 21 and the single-layer parallel wire group 22 may also be disposed outside the central tree trunk 3 and the support rod assembly 4. As shown in FIG. 6, a tail end of the single-layer parallel wire group 22 is electrically connected to the light emitting device 42 at a tail end of the support rod 41, and another tail end of the single-layer parallel wire group 22 extends toward another tail end of the support rod 41. Coated by the surrounding layer 44, the single-layer parallel wire group 22 is attached and fixed to an outer surface of the support rod 41. After the support rod 41 is plugged into the tree branch crotch portion 34, the single-layer parallel wire group 22 approaches to the central tree trunk 3 and is electrically connected to the hierarchical parallel wire group 21. The fixing mode and connecting structure of the hierarchical parallel wire group and the single-layer parallel wire group 22 further facilitate detachable connection of the support rod assembly 4. When the support rod assembly 4 is assembled and connected, the single-layer parallel wire group 22 needs not to penetrate into the central tree trunk 3 and the support rod 41, such that it is more convenient to maintain and replace.

The base 1 is provided with a support ring 11 and a hollow support cylinder 12, a support frame 13 is disposed between the support ring 11 and the support cylinder 12, and the support frame 13 fixes the support cylinder 12 to enable a bottom of the support cylinder 12 to be higher than the support ring 11, such that a wire of the power source assembly 2 penetrates into the support cylinder 12. The support ring 11 is a main support member through which the base 1 contacts the bottom surface. The support ring 11 is preferably circular, which facilitates placement and direction adjustment. At least two support frames 13 are symmetrically disposed. The support frames 13 fix the support cylinder 12 above the axis of the support ring 11 to plug the central tree trunk 3. The central tree trunk 3 includes a first tree trunk 31, a second tree trunk 32, and a third tree trunk 33. The support cylinder 12 is provided with an plug ring 35. A plug port 36 is formed at a tail end of the first tree trunk 31. A plug ring 35 is disposed at another tail end of the first tree trunk 31. A plug port 36 is formed at a tail end of the second tree trunk 32. A plug ring 35 is disposed at another tail end of the second tree trunk 32. A plug port 36 is formed at a tail end of the third tree trunk 33. A tree branch crotch portion 34 is disposed at another tail end of the third tree trunk 33. The plug port 36 may be plugged into the plug ring 35. When the decorative Christmas tree is assembled, the first tree trunk 31 is plugged into the support cylinder 12, the second tree trunk 32 is plugged into the first tree trunk 31, the third tree trunk 33 is plugged into the second tree trunk 32, and finally, the support rod assembly 4 is plugged into the tree branch crotch portion 34 at the tail end of the third tree trunk 33 as a top structure of the decorative Christmas tree. The wire of the power source assembly 2 may enter the middle of the central tree trunk 3 through the bottom of the support cylinder 12. For example, the hierarchical parallel wire group 21 penetrates from the bottom of the support cylinder 12 and is connected to the electric wire of the single-layer parallel wire group 22 penetrating from the tree branch crotch portion 34 through the middle of the central tree trunk 3. The support frame 13 fixes the support cylinder 12, such that the bottom of the support cylinder 12 is higher than the support ring 11, which may prevent the base 1 from damaging the power source assembly 2.

The power source assembly 2 is provided with an electrical plug 23, an electrical signal conversion controller 24, and a hierarchical parallel wire group 21, and the hierarchical parallel wire group 21 is electrically connected to the electrical signal conversion controller 24. The electrical signal conversion controller 24 is provided with components such as a control chip and a signal converter. The electrical signal conversion controller 24 may be further provided with an external control chip to control a light flickering frequency and a light flickering color of the light emitting chip 423, so as to obtain a light and shadow conversion effect satisfactory to the user. After the electrical plug 23 is plugged into a power source such as a socket, an electrical signal converted by the electrical signal conversion controller 24 is outputted to the light emitting device 42 by the hierarchical parallel wire group 21 and the single-layer parallel wire group 22, such that the light emitting device 42 is electrified.

Various embodiments of the present disclosure may have one or more of the following effects: In some embodiments, the decorative Christmas tree with light and shadow conversion provided by the present disclosure includes a base, a power source assembly, and a central tree trunk, where the central tree trunk is provided with at least a plurality of layers of support rod assemblies, the support rod assemblies each include at least one support rod, and an extending end of the support rod is connected to a light emitting device to form a light and shadow change; the light emitting device includes a plurality of bendable and deformable iron wires and LED light strips distributed along the iron wires, and the LED light strips each include a plurality of LED light emitting chips; in some embodiments, the present disclosure may have the following advantages; 1, the plurality of iron wires may be respectively bent at different angles or form a shape, such that a light emitting device forms a shape such as a simulated firework, and may further achieve lighting effects such as flowing light, blooming light, surrounding light, and chasing light; 2, the central tree trunk and support rod assemblies may be detached and assembled arbitrarily to form Christmas trees with different sizes and heights to fit various indoor and outdoor scenarios; and 3, the iron wires of the light emitting device may be gathered converged, which facilitates transportation, storage, and stowage.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The above content is merely a preferred embodiment of the present disclosure. For those of ordinary skill in the art, modifications may be made to the specific implementation manners and application scopes based on the concept of the present invention. The content of this specification should not be construed as limiting the present disclosure.

The disclosure claimed is:

1. A decorative Christmas tree, comprising a base (1), a power source assembly (2) is configured to be electrically connected to an external power supply, and a central tree trunk (3) mounted on the base (1), wherein:

the central tree trunk (3) is provided with at least a plurality of layers of support rod assemblies (4), and the support rod assemblies (4) are in pluggable connection to the central tree trunk (3);

the support rod assemblies (4) each comprise at least one support rod (41), and an extending end of the support rod (41) is connected to a light emitting device (42) to form a light and shadow change;

the light emitting device (42) comprises a plurality of bendable and deformable iron wires (421) and light emitting diode (LED) light strips (422) distributed along the iron wires (421), the LED light strips (422) each comprise a plurality of LED light emitting chips (423), and the LED light strips (422) are electrically connected to the power source assembly (2);

the plurality of bendable and deformable iron wires (421) are provided with common ends (424);

at least a part of the common ends (424) is tightly fixed together along an axial direction; and another part of the common ends (424) extends outward in a radial pattern through the plurality of bendable and deformable iron wires (421).

2. The decorative Christmas tree according to claim 1, wherein the LED light strips (422) are flexible light strips spirally wound on surfaces of the iron wires (421).

3. The decorative Christmas tree according to claim 1, wherein;

the plurality of bendable and deformable iron wires (421) are provided with the common ends (424), the extending end of the support rod (41) is provided with an accommodating cavity (43), and the common ends (424) are fastened in the accommodating cavity (43).

4. The decorative Christmas tree according to claim 1, wherein:

the central tree trunk (3) comprises a first tree trunk (31), a second tree trunk (32), and a third tree trunk (33);

a lower end of the first tree trunk (31) is in pluggable connection to the base (1);

the second tree trunk (32) is in pluggable connection to the first tree trunk (31); and the third tree trunk (33) is in pluggable connection to the second tree trunk (32).

5. The decorative Christmas tree according to claim 1, wherein;

the central tree trunk (3) comprises a first tree trunk (31), a second tree trunk (32), and a third tree trunk (33); and the first tree trunk (31), the second tree trunk (32), and the third tree trunk (33) are all central penetrating tree trunks.

6. The decorative Christmas tree according to claim 1, wherein:

the central tree trunk (3) is provided with a hollow tree branch crotch portion (34); and the support rod (41) is in pluggable connection to the tree branch crotch portion (34).

7. The decorative Christmas tree according to claim 1, wherein:

the power source assembly (2) is connected to a hierarchical parallel wire group (21) and a single-layer parallel wire group (22) connected to the hierarchical parallel wire group; and the single-layer parallel wire group (22) is electrically connected in parallel to the light emitting device (42).

8. The decorative Christmas tree according to claim 1, wherein:

the power source assembly (2) is connected to a hierarchical parallel wire group (21) and a single-layer parallel wire group (22) is connected to the hierarchical parallel wire group;

the support rod (41) is hollow; and the single-layer parallel wire group (22) penetrates into the hollow support rod (41) and is electrically connected to the light emitting device (42).

9. The decorative Christmas tree according to claim 1, wherein:

the power source assembly (2) is connected to a hierarchical parallel wire group (21) and a single-layer parallel wire group (22) is connected to the hierarchical parallel wire group;

the decorative Christmas tree is further provided with a surrounding layer (44) coating the support rod (41); and at least a part of the single-layer parallel wire group (22) is located between the support rod (41) and the surrounding layer (44).

10. The decorative Christmas tree according to claim 1, wherein:

the base (1) is provided with a support ring (11) and a hollow support cylinder (12);

a support frame (13) is disposed between the support ring (11) and the support cylinder (12); and the support frame (13) fixes the support cylinder (12) to enable a bottom of the support cylinder (12) to be higher than the support ring (11), such that a wire of the power source assembly (2) penetrates into the support cylinder (12).

11. The decorative Christmas tree according to claim 1, wherein:

the power source assembly (2) is provided with an electrical plug (23), an electrical signal conversion controller (24), and a hierarchical parallel wire group (21); and the hierarchical parallel wire group (21) is electrically connected to the electrical signal conversion controller (24).

* * * * *